United States Patent
Vandewall et al.

(10) Patent No.: US 12,090,097 B2
(45) Date of Patent: Sep. 17, 2024

(54) PLATFORM SYSTEM FOR SECURING A WHEELCHAIR IN POSITION WITHIN AN INTERNAL CABIN OF A VEHICLE

(71) Applicant: THE BOEING COMPANY, Arlington, VA (US)

(72) Inventors: Cynthia Vandewall, Snohomish, WA (US); Jared Bowen, Lynnwood, WA (US); Alejandro Lozano Robledo, Cincinnati, OH (US); Juan Sebastian Ramirez Loaiza, Cincinnati, OH (US); Luke Hart, Hebron, KY (US)

(73) Assignee: The Boeing Company, Arlington, VA (US)

( * ) Notice: Subject to any disclaimer, the term of this patent is extended or adjusted under 35 U.S.C. 154(b) by 11 days.

(21) Appl. No.: 18/161,963

(22) Filed: Jan. 31, 2023

(65) Prior Publication Data
US 2024/0252372 A1 Aug. 1, 2024

(51) Int. Cl.
*A61G 3/08* (2006.01)
*B64D 11/06* (2006.01)

(52) U.S. Cl.
CPC ............ *A61G 3/0808* (2013.01); *B64D 11/06* (2013.01)

(58) Field of Classification Search
CPC ........ A61G 3/0808; A61G 3/08; B64D 11/06; B64D 9/00; B64D 9/003
See application file for complete search history.

(56) References Cited

U.S. PATENT DOCUMENTS

| 9,463,966 | B1 * | 10/2016 | Damabi | B66F 7/0625 |
| 2005/0269798 | A1 * | 12/2005 | Scialabba | A61G 3/0808 |
| | | | | 280/250.1 |
| 2023/0172776 | A1 * | 6/2023 | Nishikawa | A61G 3/0808 |
| | | | | 410/7 |

FOREIGN PATENT DOCUMENTS

WO WO-2006040885 A1 * 4/2006 ........... A61G 3/0808

* cited by examiner

*Primary Examiner* — Philip J Bonzell
*Assistant Examiner* — Ashesh Dangol
(74) *Attorney, Agent, or Firm* — Joseph M. Butscher; The Small Patent Law Group LLC (57) ABSTRACT

A platform system is configured for use within an internal cabin of a vehicle. The platform system includes a base, and a support plate moveably coupled to the base. The support plate is configured to be moved in relation to the base to allow a wheelchair to be selectively secured to and removed from the support plate. For example, the support plate is moveable between a first position in which the wheelchair is supported on the support plate in a forward-facing position within the internal cabin, and a second position in which at least a portion of the support plate is moved into an aisle of the internal cabin to allow the wheelchair to be moved onto and off the support plate.

21 Claims, 10 Drawing Sheets

PLATFORM SYSTEM FOR SECURING A WHEELCHAIR IN POSITION WITHIN AN INTERNAL CABIN OF A VEHICLE

FIELD OF THE DISCLOSURE

Examples of the present disclosure generally relate to a platform system for securing a wheelchair in a desired position within an internal cabin of a vehicle.

BACKGROUND OF THE DISCLOSURE

Aircraft are used to transport passengers and cargo between various locations. A typical commercial aircraft includes a passenger seating area within an internal cabin. Passenger seats are arranged in rows. For example, a row within the internal cabin includes a first set of two or three seats separated from a second set of two or three seats by a portion of an aisle that extends between the first and second sets of seats.

Certain individuals of reduced or limited mobility may be confined to, or otherwise use, a wheelchair. These individuals typically have their wheelchairs stored in a cargo area of an aircraft during a flight, and are transferred from another wheelchair to a seat within an internal cabin of an aircraft. As can be appreciated, such a transfer process can be stressful for the individual. Further, wheelchairs that have been checked and stored in cargo can be mishandled. Additionally, individuals may be uncomfortable using wheelchairs that are not their own, such as those that are used to transfer the individuals from a gate area to a seat within an internal cabin. In general, when individuals are not able to use their own preferred wheelchairs, they may feel that their independence before, during, and after a flight is limited.

SUMMARY OF THE DISCLOSURE

A need exists for a system and a method for securing a wheelchair (whether powered or unpowered) within an internal cabin of a vehicle, such as a commercial aircraft. Further, a need exists for a system and a method that allow an individual to use his/her own wheelchair during a flight of an aircraft. Moreover, a need exists for a system and a method that ensures independence of individuals of reduced or limited mobility during a flight of an aircraft.

With those needs in mind, certain examples of the present disclosure provide a platform system for use within an internal cabin of a vehicle. The platform system includes a base, and a support plate moveably coupled to the base. The support plate is configured to be moved in relation to the base to allow a wheelchair to be selectively secured to and removed from the support plate.

In at least one example, the support plate is moveable between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

In at least one example, the base is configured to be removably secured to seat tracks secured to a floor of the internal cabin.

In at least one example, the support plate is configured to linearly move in relation to the base. In at least one other example, the support plate is configured to rotate in relation to the base. In at least one other example, the support plate is configured to linearly move and rotate in relation to the base.

The platform system can also include one or more couplers configured to secure the wheelchair on the support plate.

One or more actuators can be configured to automatically move the support plate in relation to the base.

A lock can be configured to secure the support plate in a fixed position in relation to the base.

The platform system can also include a backing panel upwardly extending from the support plate. The backing panel can include a headrest, and/or a seatbelt.

The support plate can include a front ramp having a front beveled edge. One or more ball casters can from lower surfaces of the ramp.

In at least one example, one or more gears are operatively coupled to one or both of the base or the support plate.

Certain examples of the present disclosure provide a vehicle, including an internal cabin having a floor and seat tracks secured to the floor, and a platform system within the internal cabin of the vehicle, as described herein.

Certain examples of the present disclosure provide a method for use within an internal cabin of a vehicle. The method includes moveably coupling a support plate to a base; and moving the support plate in relation to the base to allow a wheelchair to be selectively secured to and removed from the support plate, wherein said moving comprises moving the support plate between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
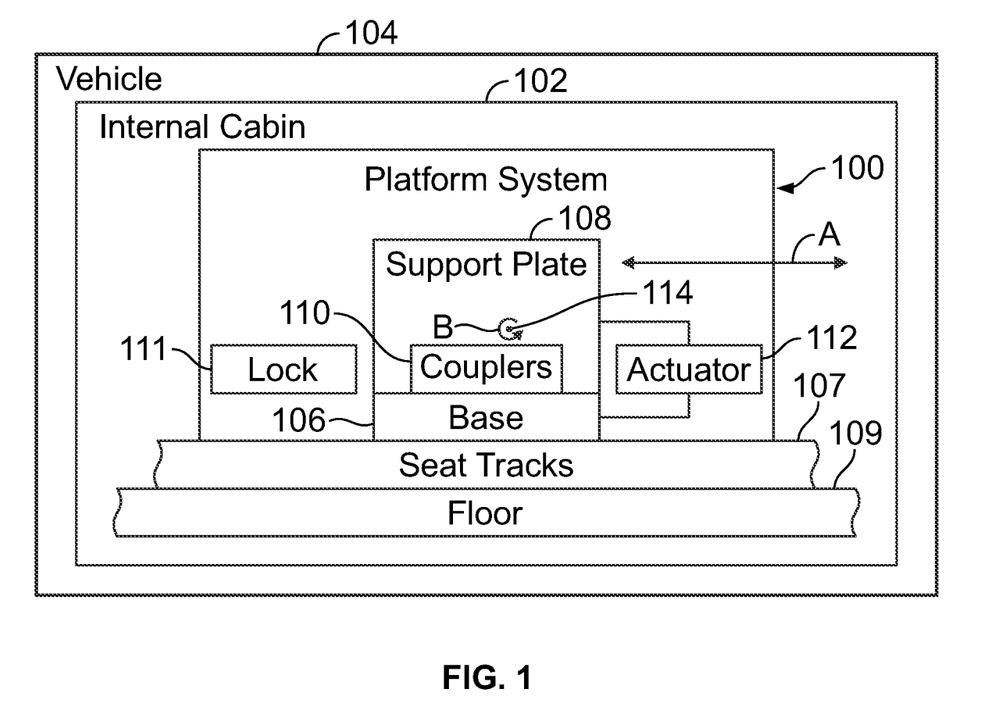
FIG. 1 illustrates a block diagram a platform system within an internal cabin of a vehicle, according to an example of the present disclosure.

FIG. 1 illustrates a block diagram a platform system 100 within an internal cabin 102 of a vehicle 104, according to an example of the present disclosure. In at least one example, the vehicle 104 is a commercial aircraft. Optionally, the vehicle 104 can be a land-based vehicle, such as a bus or train car, a watercraft, a spacecraft, or the like. The platform system 100 is configured to receive and retain one or more portions of a wheelchair within the internal cabin 102 to secure the wheelchair in position during a trip, such as a flight. The platform system 100 can also be used to move and support various other items within the internal cabin 102, such as cargo items. The platforms system 100 can also be used to receive, retain, and move components, such as seat assemblies, during a manufacturing process of the vehicle 104.

The platform system 100 includes a base 106, which can be fixed to one or more seat tracks 107 secured to a floor 109 within the internal cabin 102. The seat tracks 107 can also be used to secure seat assemblies for passengers within the internal cabin 102. The base 106 secures to the seat tracks 107 through one or more securing studs, fasteners, and/or the like. The base 106 is fixed in position within the internal cabin 102. In at least one example, the base 106 can be moved within the internal cabin, in a similar fashion as a seat or monument.

The platform system 100 also includes a support plate 108 that is moveably secured to the base 106. The support plate 108 is configured to move in relation to the base 106 between various positions. In at least one example, the support plate 108 is configured to linearly move into an aisle of the internal cabin 102. The support plate 108 is further configured to rotate about a central axis. The support plate 108 is configured to one or both of linearly move and/or rotate between a first position, such as a forward-facing position in which a wheelchair is oriented such that an individual is forward-facing, and a second position, such as receiving position, in which the support plate 108 is configured to receive the wheelchair, such as within a portion of the aisle of the internal cabin 102.

In at least one example, the platform system 100 can include one or more couplers 110 that are configured to secure a wheelchair on the support plate 108. For example, the coupler(s) 110 are configured to securely retain on or more portions of the wheelchair. Examples of the couplers 110 include latches, clamps, ties, magnets, and/or the like.

In at least one example, the platform system 100 also includes one or more actuators 112 operatively coupled to one or both of the support plate 108 and/or the base 106. The actuator(s) 112 can be servos, motors, and/or the like. The actuator(s) 112 are configured to automatically move the support plate 108 in relation to the base 106, as described herein. Optionally, the platform system 100 may not include an actuator. Instead, the support plate 108 can be manually moved in relation to the base 106.

In operation, the support plate 108 is moved from the first position into the second position to receive the wheelchair. The wheelchair is moved onto the support plate 108 in the second position, and is secured to the support plate 108, such as via the coupler(s) 110. Once secured onto the support plate 108 in the second position, the support plate 108 having the wheelchair secured thereon is moved back to the first position so that an individual seated on the wheelchair can be oriented in a forward-facing, secured position during a trip, such as a flight. In this manner, the individual can be seated on the wheelchair during an entirety of the trip, instead of being transferred from a different wheelchair onto a separate seat assembly. Upon completion of the trip, the support plate 108 is moved back to the second position, and the wheelchair is uncoupled from the coupler(s) 110 to so that the individual seated on the wheelchair can disembark from the internal cabin 102.

The platform system 100 provides a mechanical platform that can be secured at various locations within the internal cabin 102, such as via the seat tracks 107. The platform system 100 allows individuals to dock their personal wheelchairs (such as powered of unpowered wheelchairs, scooters, or the like) in position within the internal cabin, instead of being transferred to a standard seat assembly. In at least one example, the support plate 108 is configured to linearly move in the directions of arrows A. For example, the support plate 108 is configured to linearly move into an aisle to receive the wheelchair. In at least one example, the support plate 108 is further configured to rotate in the directions of arc B about an axis 114. The support plate 108 is configured to linearly translate and rotate between different positions. Optionally, the support plate 108 may be configured to only linearly translate or rotate between different positions.

In at least one example, the support plate 108 is configured to linearly translate into an aisle, and then rotate to an accessible angle, so that an individual seated on a wheelchair can seamlessly roll onto and off the support plate 108. When not in use, the platform system 100 can be removed from the internal cabin 102. The platform system 100 allows individuals who use wheelchairs to fly with their own personal wheelchair, thereby eliminating the challenge of being transferred to multiple, unfamiliar seats, and also preventing or otherwise reducing a potential of the personal wheelchairs being mishandled by others.

In at least one example, the couplers 110 are configured to securely lock a wheelchair in place during a trip. The couplers 110 can include one or more locking pins, brackets, and/or guides located at one or various positions of the support plate 108 and/or the base 106. In at least one example, the platform system 100 can further include a seatbelt, which can be used to further secure an individual within the wheelchair during a flight, for example. The seatbelt can be secured to the support plate 108, and/or a backing panel.

The platform system 100 can also include a lock 111 configured to secure the support plate 108 in secured fixed position in relation the base 106. For example, the lock 111 can be a pin that moveably mounted on the support plate 108 and configured to be moved between a locked and unlock position with respect to the base 106. The pin can be configured to move into and out of a reciprocal retainer, such as a hole, opening, recess, or the like, formed in the base 106. In another example, the lock 111 can be a latch. As another example, the lock 111 can be a hook configured to secure to a reciprocal opening, loop, or the like.

Figure 2:
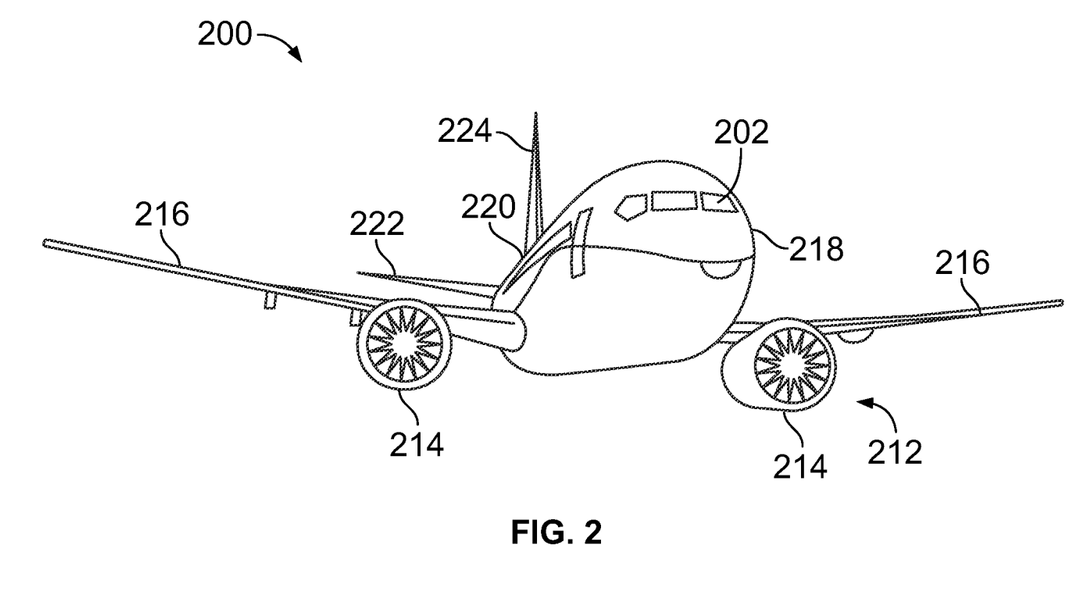
FIG. 2 illustrates a perspective front view of an aircraft, according to an example of the present disclosure.

FIG. 2 illustrates a perspective front view of an aircraft 200, according to an example of the present disclosure. The aircraft 200 is an example of the vehicle 104 shown and described with respect to FIG. 1. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224. The fuselage 218 of the aircraft 200 defines an internal cabin 202, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 202 is an example of the internal cabin 102 shown in FIG. 1.

FIG. 2 shows an example of an aircraft 200. It is to be understood that the aircraft 200 can be sized, shaped, and configured differently than shown in FIG. 2. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft.

Figure 3A:
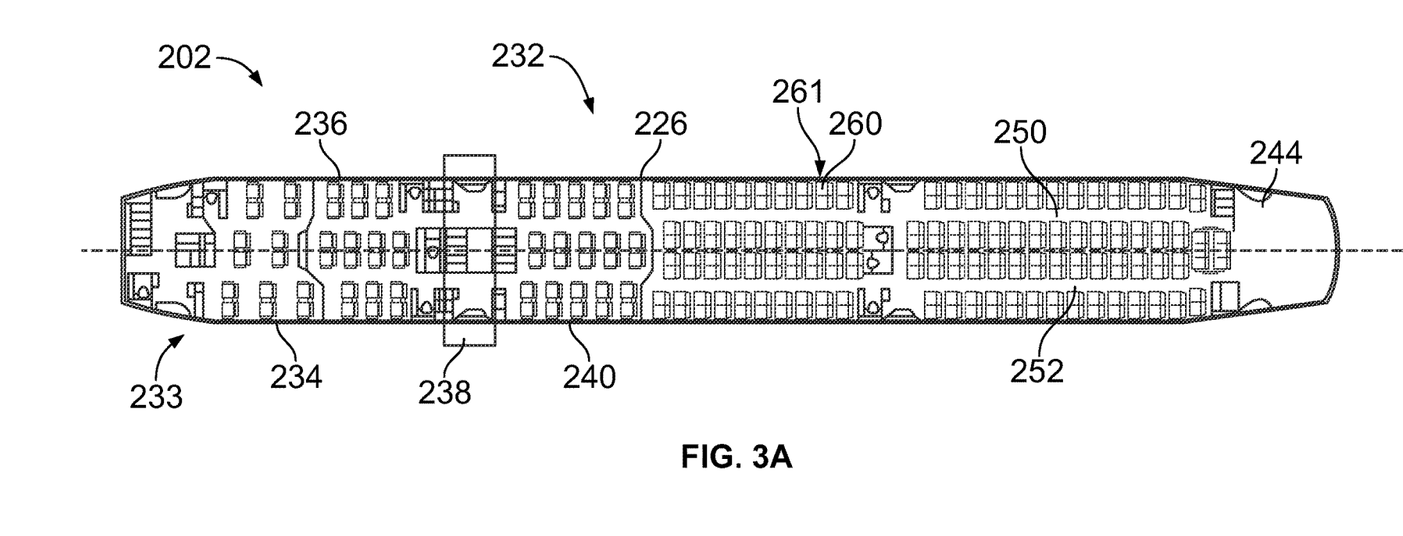
FIG. 3A illustrates a top plan view of an internal cabin of an aircraft, according to an example of the present disclosure.

FIG. 3A illustrates a top plan view of an internal cabin 202 of an aircraft, according to an example of the present disclosure. The internal cabin 202 is an example of the internal cabin 102 shown and described with respect to FIG. 1. The internal cabin 202 may be within a fuselage 232 of the aircraft. For example, one or more fuselage walls may define an interior of the internal cabin 202. The interior of the internal cabin 202 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 202.

The internal cabin 202 includes multiple sections, including a front section 233, a first class section 234, a business class section 236, a front galley station 238, an expanded economy or coach section 240, a standard economy or coach section, and an aft section 244, which may include multiple lavatories and galley stations. It is to be understood that the internal cabin 202 may include more or less sections than shown. For example, the internal cabin 202 may not include a first class section, and may include more or less galley stations than shown.

As shown in FIG. 3A, the internal cabin 202 includes two aisles 250 and 252 that lead to the aft section 244. Optionally, the internal cabin 202 may have less or more aisles than shown. For example, the internal cabin 202 may include a single aisle that extends through the center of the internal cabin 202 that leads to the aft section 244.

Seats 260 are positioned throughout the internal cabin 202. The seats 260 may be arranged in rows 261. Referring to FIGS. 1 and 3A, one or more platform systems 100 can replace one or more seats 260 within the internal cabin 202. The platform systems 100 can be secured to seat tracks 107 in the same way that the seats 260 are secured to the seat tracks 107.

Figure 3B:
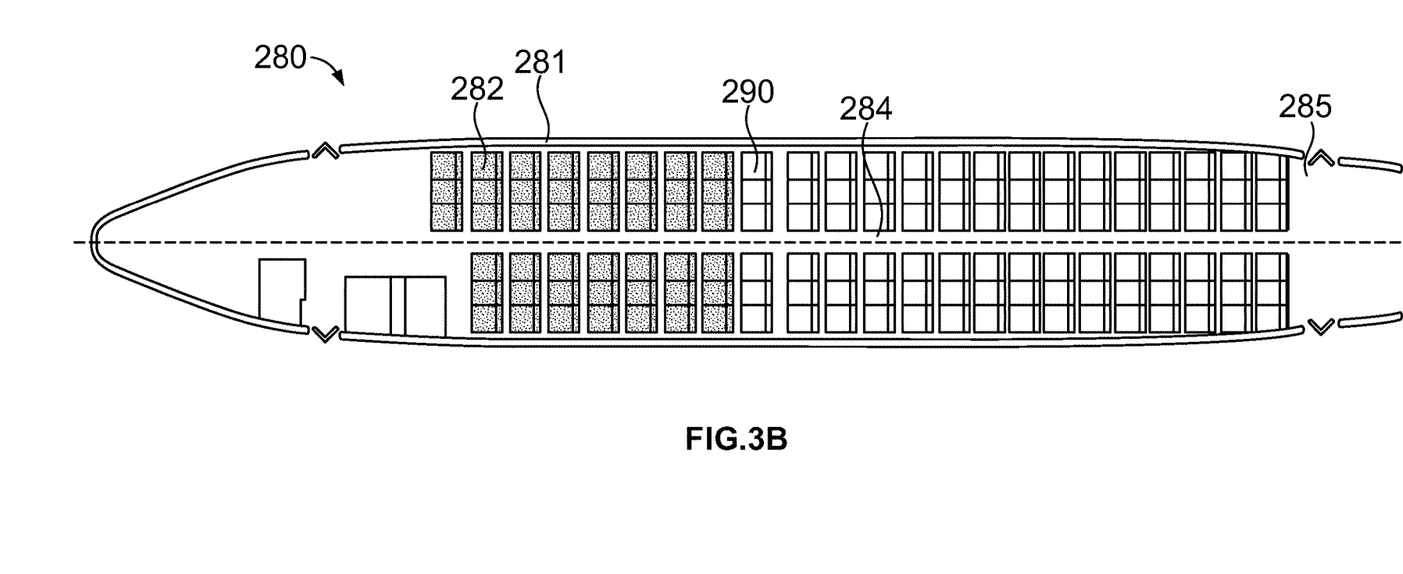
FIG. 3B illustrates a top plan view of an internal cabin of an aircraft, according to an example of the present disclosure.

FIG. 3B illustrates a top plan view of an internal cabin 280 of an aircraft, according to an example of the present disclosure. The internal cabin 280 is an example of the internal cabin 102 shown and described with respect to FIG. 1. The internal cabin 280 may be within a fuselage 281 of the aircraft. For example, one or more fuselage walls may define the interior of the internal cabin 280. The internal cabin 280 includes multiple sections, including a main cabin 282 having one or more seat seats 290, and an aft section 285 behind the main cabin 282. It is to be understood that the internal cabin 280 may include more or less sections than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280. Referring to FIGS. 1 and 3B, one or more platform systems 100 can replace one or more seats 290 within the internal cabin 202. The platform systems 100 can be secured to seat tracks 107 in the same way that the seats 290 are secured to the seat tracks 107.

Figure 4:
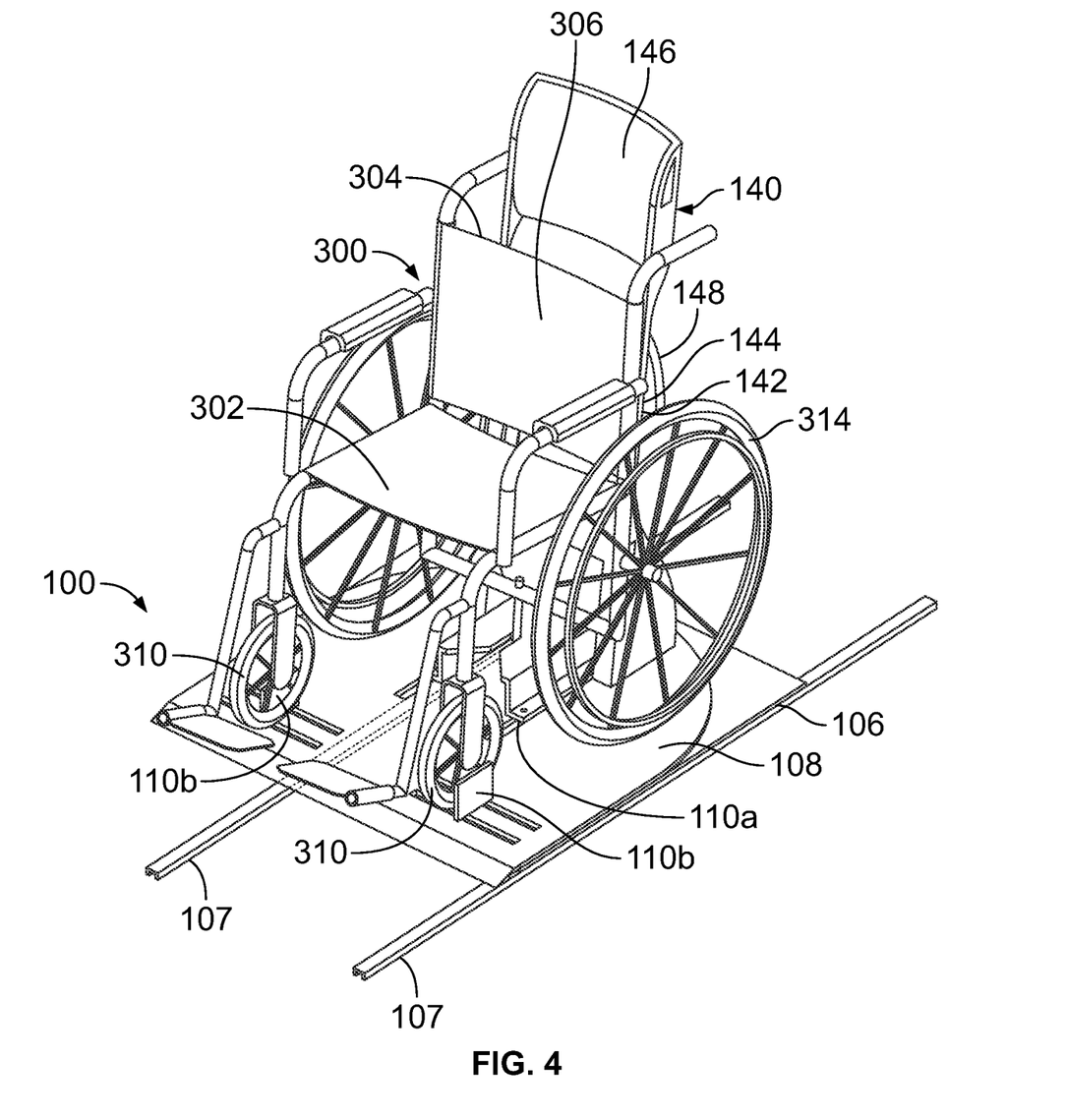
FIG. 4 illustrates an isometric front view of a wheelchair secured to a platform system in a first position, according to an example of the present disclosure.

FIG. 4 illustrates an isometric front view of a wheelchair 300 secured to a platform system 100 in a first position, according to an example of the present disclosure. The first position can be a forward-facing position such that an individual seated on a support seat 302 of the wheelchair 300 is oriented in a forward-facing position, such as during a flight of an aircraft.

The platform system 100 can further include a backing panel 140. The backing panel 140 provides a rigid seat back, which can be used to store items, such as seatbelts. Further, the actuator(s) 112 (shown in FIG. 1) can be stored within the backing panel 140. As another example, a floatation device can be stored within the backing panel 140.

In at least one example, the backing panel 140 includes an upright portion 142 that upwardly extends from the support plate 108 and/or the base 106. The upright portion 142 includes a wheelchair backing support segment 144 against which a rear portion of the wheelchair 300 is configured to abut. A headrest 146 may upwardly extend from the upright portion 142 and can be configured to extend above a top 304 of a backrest 306 of the wheelchair 300. In at least one example, a seatbelt 148 is secured to the backing panel 140, and is configured to allow an individual to selectively buckle and unbuckle the seatbelt 148 around a waist while seated in the support seat 302. Optionally, the platform system 100 may not include the backing panel 140. As another example, instead of a backing panel 140, the platform system 100 can include a seat assembly having a seat support, such as a basin, pan, cushion, and/or the like, that is moveable between a seating position, and an upwardly or downwardly folded position, which allows a wheelchair to be moved thereagainst (instead of an upright panel).

As shown, the base 106 is secured to the parallel seat tracks 107. The seat tracks 107 are otherwise used to secure seats in place within an internal cabin.

Figure 5:
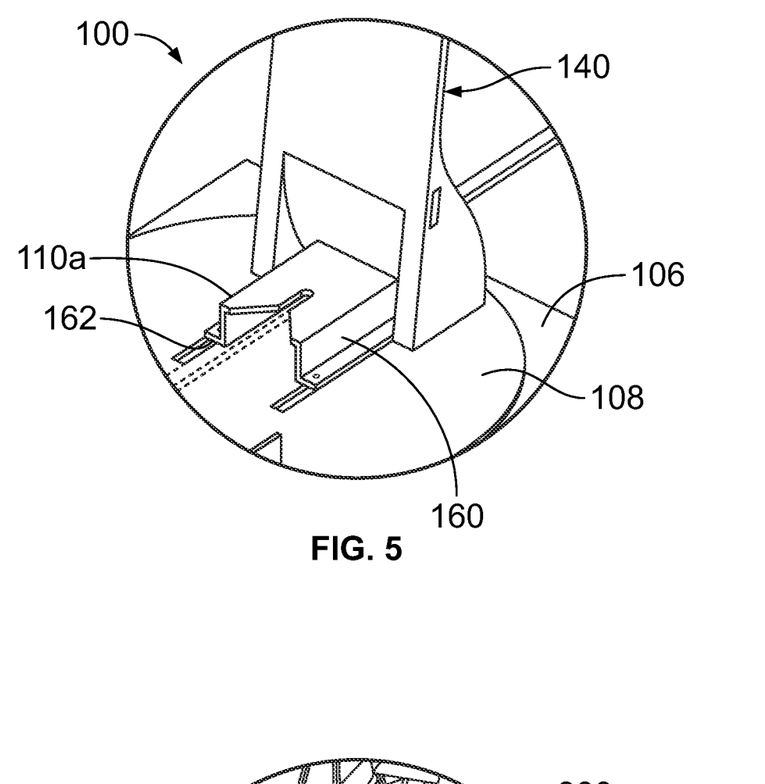
FIG. 5 illustrates an isometric front view of an aft coupler secured to a support plate, according to an example of the present disclosure.
Figure 6:
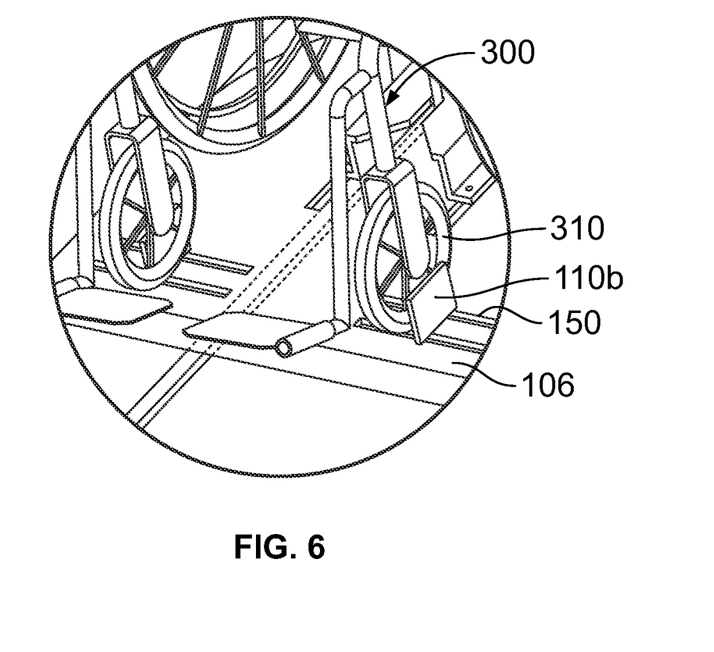
FIG. 6 illustrates an isometric front view of a forward coupler secured to the support plate, according to an example of the present disclosure.

FIG. 5 illustrates an isometric front view of an aft coupler 110*a* secured to the support plate 108, according to an example of the present disclosure. FIG. 6 illustrates an isometric front view of a forward coupler 110*b* secured to the support plate 108, according to an example of the present disclosure. Referring to FIGS. 4-6, the platform system 100 can include the aft coupler 110*a* and forward couplers 110*b*. In at least one example, the aft coupler 110*a* is a latching assembly secured to the support plate 108. As shown, the aft coupler 110*a* can be proximate to and/or otherwise secured to the backing panel 140. The aft coupler 110*a* can be configured to removably latch onto a portion of the wheelchair, such as a bar, beam, and/or the like. In at least one example, the forward couplers 110*b* can be flaps that are configured to abut against forward wheels 310 of the wheelchair 300. The flaps can be configured to move, such as by linearly translating over tracks 150 formed in the support plate 108.

In at least one example, the aft coupler 110*a* provides a docking unit for the wheelchair 300. The aft coupler 110*a* includes a housing 160 that includes a lead-in channel 162 that is configured to receive and retain a portion of the wheelchair 300. The portion can be a post, beam, column, pin, and/or the like, such as of a frame of the wheelchair 300. The housing 160 retains one or more latches, clamps, brackets, and/or the like that removably secure to the portion of the wheelchair 300. Optionally, the aft coupler 110*a* can include a tie, cable, or the like that is configured to securely tie onto a portion of the wheelchair 300. In at least one other example, the coupler 110*a* can be disposed at various other portions of the support plate 108, and configured to removably secured to other portions of the wheelchair 300. As another example, the couplers 110*b* can be disposed further back on the support plate 108, and configured to abut into rear wheels 314 of the wheelchair 300. Optionally, the platform system 100 may include less than all of the couplers 110*a* and 110*b* shown in FIGS. 4-6.

Figure 7:
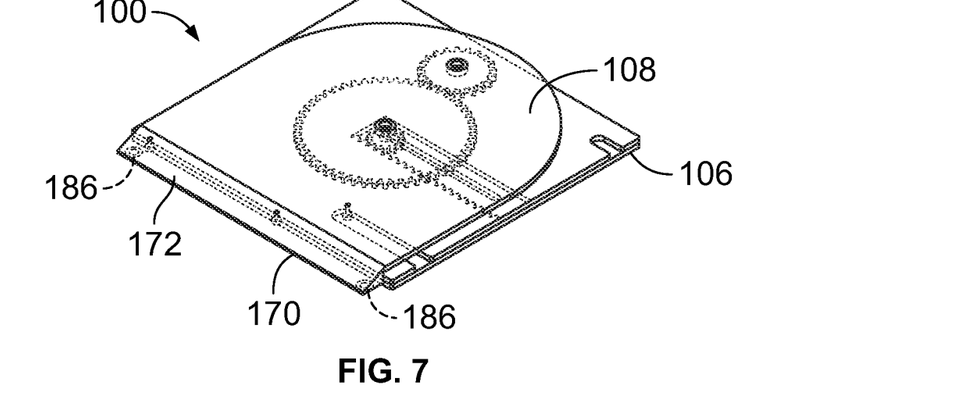
FIG. 7 illustrates an isometric top view of a platform system, according to an example of the present disclosure.
Figure 8:
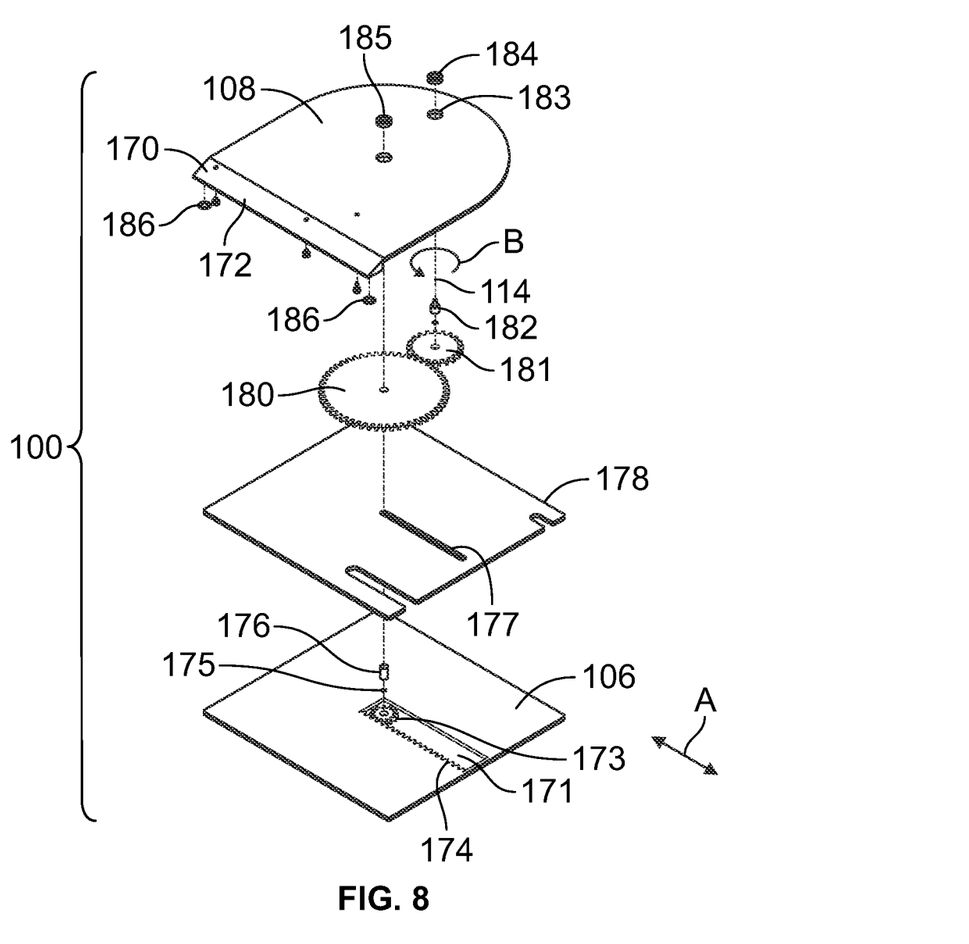
FIG. 8 illustrates an isometric exploded view of the platform system of FIG. 7.

FIG. 7 illustrates an isometric top view of a platform system 100, according to an example of the present disclosure. The support plate 108 is shown transparent in order for internal components to be seen. FIG. 8 illustrates an isometric exploded view of the platform system 100 of FIG. 7. Referring to FIGS. 7 and 8, the support plate 108 can include a front ramp 170, which include a front beveled edge 172. The front ramp 170 is configured to allow a wheelchair to be easily moved onto and off the support plate 108.

The base 106 can be a flat panel having a channel 171 formed therein. The channel 171 retains a lower gear 173 on a geared track 174. A thrust ball bearing 175 couples a keyed shaft 176 to the lower gear 173. The shaft 176 extends upwardly through a reciprocal channel 177 formed in an intermediate plate 178, which can be sandwiched between the base 106 and the support plate 108. The intermediate plate 178 can be a separate plate, or a moveable portion of the base 106 and/or the support plate 108. An upper gear 180 operatively couples to the shaft 176. A drive gear 181 is operatively coupled to the upper gear 180 on the intermediate plate 178. The drive gear 181 is, in turn, operatively coupled to a drive shaft 182 that extends through a reciprocal opening 183 formed through the support plate 108, and couples to a ball bearing 184 on an upper surface of the support plate 108. Similarly, a ball bearing 185 can couple to a shaft extending coupled to the upper gear 180. One or more recessed ball casters 186 can extend from lower surfaces of the support plate 108, such as at or proximate to the ramp 170.

Referring to FIGS. 1, 7, and 8, the actuator(s) 112 can be used to move the platform system 100 between various positions. The actuator(s) 112, such as one or more servos, motors, or the like, can be operatively coupled to one or more of the support plate 108, the intermediate plate 178, the base 106, and/or more one or more of the gears to move the support plate 108 relative to the intermediate plate 178 and/or the base 106. Optionally, the support plate 108 can be moved manually, without the use of an actuator.

In operation, the support plate 108 is configured to linearly translate in the directions of arrows A by the lower gear 173 moving the through the channel 171. In response, the shaft 176 moves the upper gear 180, which is coupled to the support plate 108 in the same directions. The support plate 108 is further configured to rotate about the axis 114 defined by the drive shaft 182 in the directions of arc B by way of the upper gear 180 rotating the drive gear 181, or vice versa. The lock 111 (shown in FIG. 1) can be used to securely retain the support plate 108 in a fixed position relative to the base 106, such as in a forward-facing position.

The platform system 100 can include more or less components than shown. For example, in at least one example, the support plate 108 can be a central hub that is configured to rotate relative to the base 106, but not linearly translate. As another example, the support plate 108 can be a slide plate that is configured to linearly slide between different positions, but not rotate.

The platform system 100 is configured to be moved between various positions, such as a first position in which the support plate 108 is in a forward-facing position, and a second position, in which at least a portion of the support plate 108 is disposed within an aisle and configured to receive a wheelchair, through operation of the various gears, drive shafts, and/or the like. In at least one example, the support plate 108 is configured to rotate relative to the base 106 through various degrees of rotation so that an individual can easily gain access to the platform system 100 during phases of travel of a vehicle. The support plate 108 can also be moved to allow other passengers to more easily move into assigned seat positions (for example, window seat positions that are outboard from aisle seat positions) within the internal cabin 102.

As noted, the platform system 100 can be automatically moved via the one or more actuators 112. A control panel can be disposed on a portion of the platform system 100, such as on the support plate 108, the backing panel 140, and/or the like. As another example, the control panel can be part of a remote control device, such as a handheld device (for example, a smart phone or tablet) of an individual. The control panel is operatively coupled to the actuator(s) 112. Optionally, the platform system 100 may not include a control panel. Instead, the actuator(s) 112 can be automatically operated based on motion, such as movements of the support panel 108 in particular directions.

As described herein, in at least one example, the support plate 108 is configured to move in relation to the base 106 so that wheelchair users can easily access their assigned positions within an internal cabin. The platform system 100 can be configured to removably secure to the seat tracks 107. In this manner, the platform system 100 may be selectively installed and removed from an internal cabin, based on need.

As another example, the platform system 100 can be used within a lavatory within the internal cabin of the vehicle. The platform system 100 can be used to assist individuals who use wheelchairs within the lavatory.

Figure 9:
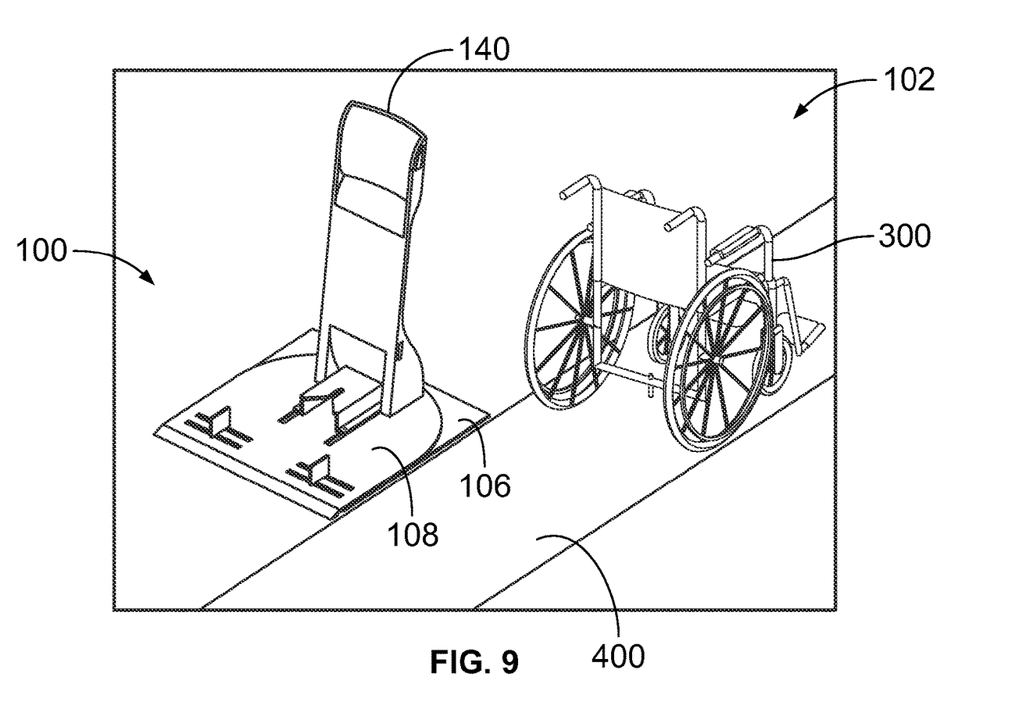
FIG. 9 illustrates a platform system in an initial position within an internal cabin, according to an example of the present disclosure.

FIG. 9 illustrates a platform system 100 in an initial position within an internal cabin, according to an example of the present disclosure. A wheelchair 300 is disposed within an aisle 400 between rows of seats. The initial position can be a forward-facing position. As shown, the wheelchair 300 is not disposed on the support plate 108.

Figure 10:
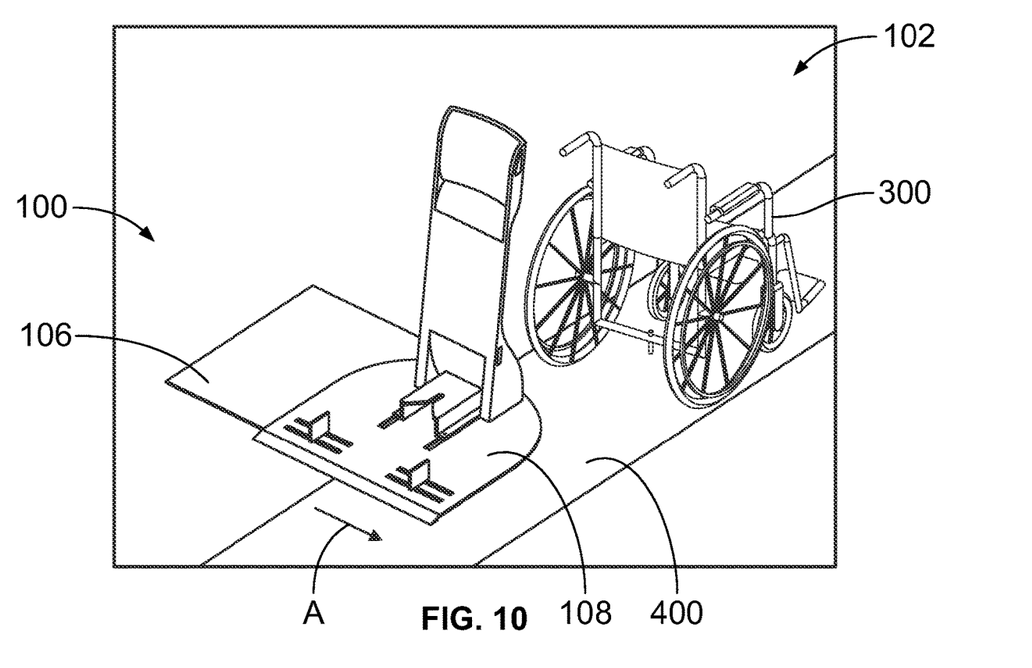
FIG. 10 illustrates the platform system of FIG. 9 having a support plate moved into an aisle of the internal cabin.

FIG. 10 illustrates the platform system of FIG. 9 having the support plate 108 moved into the aisle 400 of the internal cabin 102. The support plate 108 can be linearly moved in relation to the base 106 into the aisle 400 in the direction of arrow A.

Figure 11:
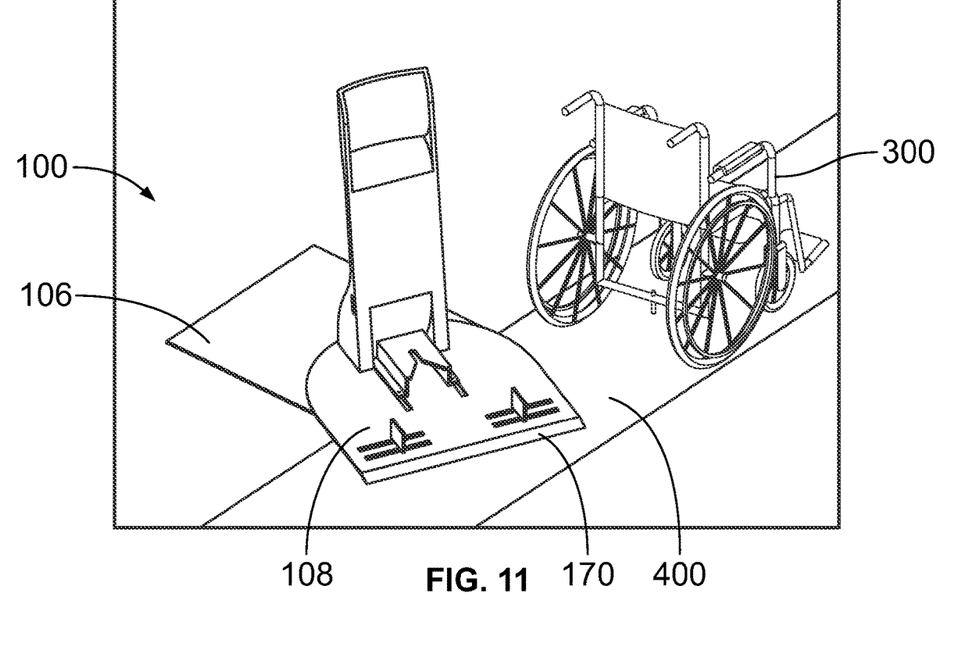
FIG. 11 illustrates the platform system of FIG. 10 having the support plate being rotated toward a wheelchair in an aisle.

FIG. 11 illustrates the platform system 100 of FIG. 10 having the support plate 108 being rotated toward the wheelchair 300 in the aisle 400. The support plate 108 rotates relative to the base 106 so that the ramp 170 is moved toward a facing position in relation to the wheelchair 300.

Figure 12:
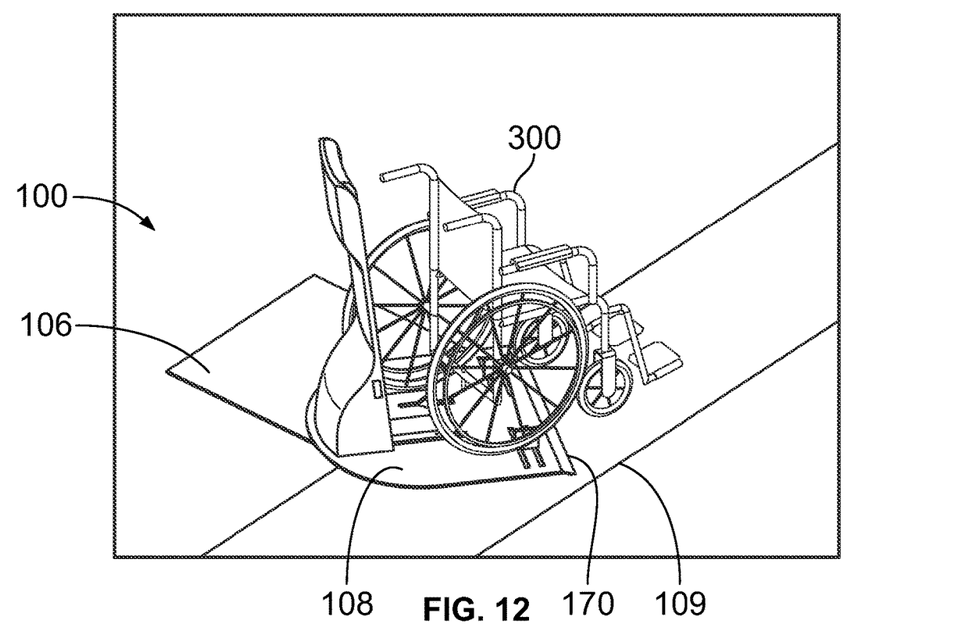
FIG. 12 illustrates the platform system of FIG. 11 having the support plate rotated into a receiving position to receive the wheelchair.

FIG. 12 illustrates the platform system 100 of FIG. 11 having the support plate 108 rotated into a receiving position to receive the wheelchair 300. While the support plate 108 is in the aisle, the casters 186 (shown in FIGS. 7 and 8) provide rolling support on the floor 109. The wheelchair 300 can be backed onto the support plate, with the ramp 170 allowing for ease of motion onto the support plate 108. Once the wheelchair 300 is in a desired position on the support plate 108, the coupler(s) 110 (shown in FIGS. 1 and 4-6) can be used to secure the wheelchair 300 onto the support plate 108.

Figure 13:
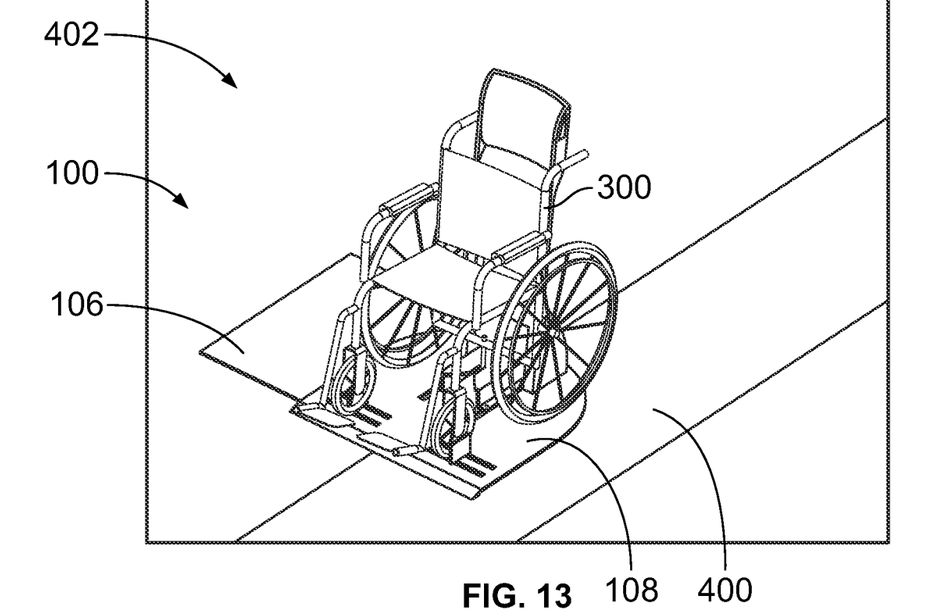
FIG. 13 illustrates the platform system of FIG. 12 in which the support plate supporting the wheelchair is rotated to a position to allow the wheelchair to be moved into a row.
Figure 14:
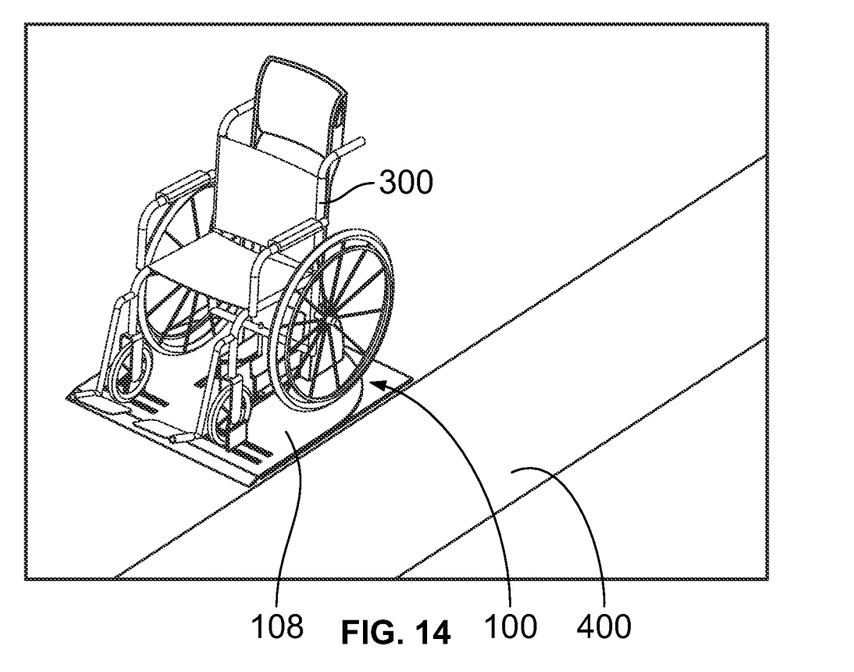
FIG. 14 illustrates the platform system of FIG. 13 in which the support plate supporting the wheelchair is moved back into the initial position.

FIG. 13 illustrates the platform system 100 of FIG. 12 in which the support plate 108 supporting the wheelchair 300 is rotated to a position to allow the wheelchair to be moved into a row 402. FIG. 14 illustrates the platform system 100 of FIG. 13 in which the support plate 108 supporting the wheelchair 300 is moved back into the initial position such that the support plate 108 is no longer in the aisle 400, and the wheelchair 300 faces forward. The process described in relation to FIGS. 9-14 can be reversed to allow the wheelchair to be moved off the support plate 108 and back into the aisle 400. As another example, the support plate 108 can be linearly moved (without being rotated) into the aisle to allow the wheelchair in a forward-facing orientation into the aisle.

Referring to FIGS. 1-4, the platform system 100 is configured for use within the internal cabin 102 of the vehicle 104, such as a commercial aircraft. The platform system 100 includes the base 106, and the support plate 108 moveably coupled to the base 106. The support plate 108 is configured to be moved in relation to the base 106 to allow the wheelchair 300 to be selectively secured to and removed from the support plate 108. In at least one example, the support plate 108 is moveable between a first position in which the wheelchair 300 is supported on the support plate 108 in a forward-facing position within the internal cabin 102, and a second position in which at least a portion of the support plate 108 is moved into the aisle 400 of the internal cabin 102 to allow the wheelchair 300 to be moved onto and off the support plate 108.

Figure 15:
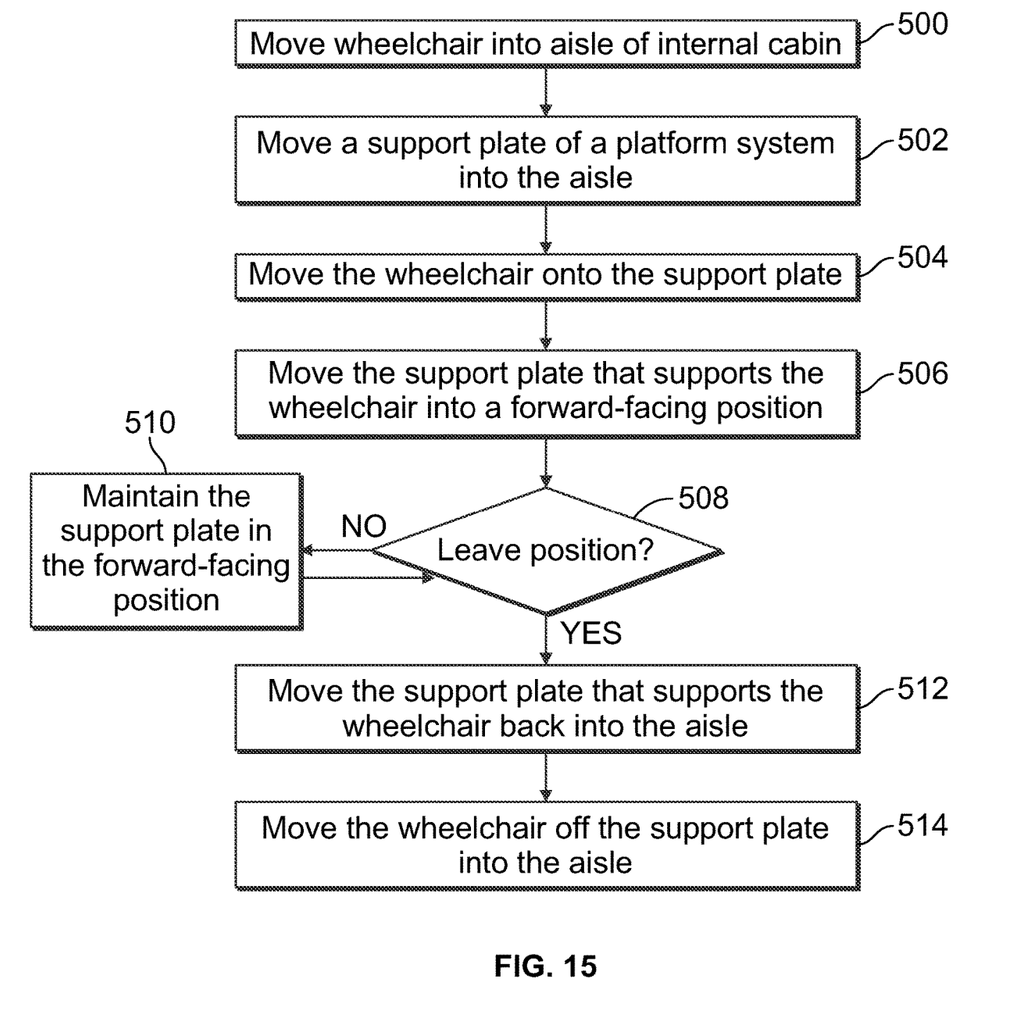
FIG. 15 illustrates a flow chart of a method, according to an example of the present disclosure.

FIG. 15 illustrates a flow chart of a method, according to an example of the present disclosure. Referring to FIGS. 1-15, at 500, a wheelchair 300 is moved into an aisle 400 of an internal cabin 102. At 502, a support plate 108 of a platform system 100 is moved into the aisle 400, such as into a receiving position, at which the support plate 108 is configured to receive the wheelchair 300 thereon. At 504, the wheelchair 300 is moved onto the support plate 108. At 506, the support plate 108 that supports the wheelchair 300 is then moved into a forward-facing position, at which the wheelchair 300 is moved into an assigned position within the internal cabin 102 (such as a seating position) and faces forward.

At 508, it is determined if the wheelchair 300 is to leave the assigned position. If not, the method proceeds to 510, at which the support plate 108 is maintained in the forward-facing position.

If, however, the wheelchair 300 is to leave the assigned position at 508, the method proceeds to 512, at which the support plate 108 that supports the wheelchair 300 is moved back into the aisle. At 514, the wheelchair 300 is then moved off the support plate 108 back into the aisle 400.

In at least one example, a loading orientation (for example, loading from a front or a rear position) of the wheelchair relative to the platform system 100 may first be determined. Once loaded, there may be a decision to determine a direction the individual desires to move (such as forward or aft). After the wheelchair moves off the platform system 100, the support plate 108 returns to an initial position in the row so as not to obstruct the aisle. The support plate 108 can also be moved with the wheelchair supported thereon to provide a clear pathway for other passengers to gain access to the row and/or aisle.

Further, the disclosure comprises examples according to the following clauses:

Clause 1. A platform system for use within an internal cabin of a vehicle, the platform system comprising:
a base; and
a support plate moveably coupled to the base, wherein the support plate is configured to be moved in relation to the base to allow a wheelchair to be selectively secured to and removed from the support plate.

Clause 2. The platform system of Clause 1, wherein the support plate is moveable between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

Clause 3. The platform system of Clauses 1 or 2, wherein the base is configured to be removably secured to seat tracks secured to a floor of the internal cabin.

Clause 4. The platform system of any of Clauses 1-3, wherein the support plate is configured to linearly move in relation to the base.

Clause 5. The platform system of any of Clauses 1-3, wherein the support plate is configured to rotate in relation to the base.

Clause 6. The platform system of any of Clauses 1-3, wherein the support plate is configured to linearly move and rotate in relation to the base.

Clause 7. The platform system of any of Clauses 1-6, further comprising one or more couplers configured to secure the wheelchair on the support plate.

Clause 8. The platform system of any of Clauses 1-7, further comprising one or more actuators configured to automatically move the support plate in relation to the base.

Clause 9. The platform system of any of Clauses 1-8, further comprising a lock configured to secure the support plate in a fixed position in relation to the base.

Clause 10. The platform system of any of Clauses 1-9, further comprising a backing panel upwardly extending from the support plate.

Clause 11. The platform system of Clause 10, wherein the backing panel comprises a headrest.

Clause 12. The platform system of Clauses 10 or 11, wherein the backing panel comprises a seatbelt.

Clause 13. The platform system of any of Clauses 1-12, wherein the support plate comprises a front ramp having a front beveled edge.

Clause 14. The platform system of Clause 13, further comprising one or more ball casters extending from lower surfaces of the ramp.

Clause 15. The platform system of any of Clauses 1-14, further comprising one or more gears operatively coupled to one or both of the base or the support plate.

Clause 16. A vehicle, comprising:
an internal cabin including a floor and seat tracks secured to the floor; and
a platform system within the internal cabin of the vehicle, the platform system comprising:
a base removably secured to the seat tracks; and
a support plate moveably coupled to the base, wherein the support plate is configured to be moved in relation to the base to allow a wheelchair to be selectively secured to and removed from the support plate,
wherein the support plate is moveable between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

Clause 17. The vehicle of Clause 16, wherein the support plate is configured to linearly move and rotate in relation to the base.

Clause 18. The vehicle of Clauses 16 or 17, wherein the platform system further comprises:
one or more couplers configured to secure the wheelchair on the support plate;
one or more actuators configured to automatically move the support plate in relation to the base;
a lock configured to secure the support plate in a fixed position in relation to the base; and
a backing panel upwardly extending from the support plate, wherein the backing panel comprises a headrest and a seatbelt.

Clause 19. A method for use within an internal cabin of a vehicle, the method comprising:
moveably coupling a support plate to a base; and
moving the support plate in relation to the base to allow a wheelchair to be selectively secured to and removed from the support plate, wherein said moving comprises moving the support plate between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

Clause 20. The method of Clause 19, wherein said moving comprises linearly moving and rotating the support plate in relation to the base.

As described herein, examples of the present disclosure provide systems and methods for securing a wheelchair (whether powered or unpowered) within an internal cabin of a vehicle, such as a commercial aircraft. Further, examples of the present disclosure provide systems and methods that allow an individual to use his/her own wheelchair during a flight of an aircraft. Moreover, examples of the present disclosure provide systems and methods that ensure independence of individuals of reduced or limited mobility during a flight of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A platform system for use within an internal cabin of a vehicle, the platform system comprising:
a base having a first channel;

a lower gear on a geared tracked retained within the first channel;
a first ball bearing coupling a keyed shaft to the lower gear;
a support plate moveably coupled to the base, wherein the support plate includes an opening, and wherein the support plate is configured to be moved in relation to the base to allow a wheelchair to be selectively secured to and removed from the support plate;
an intermediate plate between the base and the support plate, wherein the intermediate plate includes a second channel, and wherein the keyed shaft extends through the second channel;
an upper gear on the intermediate plate, and operatively coupled to the keyed shaft;
a drive gear operatively coupled to the upper gear; and
a drive shaft extending through the opening of the support plate, wherein the drive shaft is coupled to the drive gear.

2. The platform system of claim 1, wherein the support plate is moveable between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

3. The platform system of claim 1, wherein the base is configured to be removably secured to seat tracks secured to a floor of the internal cabin.

4. The platform system of claim 1, wherein the support plate is configured to linearly move in relation to the base.

5. The platform system of claim 1, wherein the support plate is configured to rotate in relation to the base.

6. The platform system of claim 1, wherein the support plate is configured to linearly move and rotate in relation to the base.

7. The platform system of claim 1, further comprising one or more actuators configured to automatically move the support plate in relation to the base.

8. The platform system of claim 1, further comprising a lock configured to secure the support plate in a fixed position in relation to the base.

9. The platform system of claim 1, further comprising a backing panel upwardly extending from the support plate.

10. The platform system of claim 9, wherein the backing panel comprises a headrest.

11. The platform system of claim 9, wherein the backing panel comprises a seatbelt.

12. The platform system of claim 1, wherein the support plate further comprises a front ramp having a front beveled edge.

13. The platform system of claim 12, further comprising one or more ball casters extending from lower surfaces of the front ramp.

14. The platform system of claim 1, further comprising:
a second ball bearing on the support plate, wherein the drive shaft is coupled to the second ball bearing; and
a third ball bearing coupled to the upper gear.

15. The platform system of claim 1, further comprising:
an aft coupler secured to the support plate, wherein the aft coupler is configured to removably latch onto a portion of the wheelchair; and
forward couplers moveably coupled to tracks formed in the support plate.

16. A vehicle, comprising:
an internal cabin including a floor and seat tracks secured to the floor; and
a platform system within the internal cabin of the vehicle, the platform system comprising:
a base removably secured to the seat tracks, wherein the base has a first channel;
a lower gear on a geared tracked retained within the first channel;
a first ball bearing coupling a keyed shaft to the lower gear;
a support plate moveably coupled to the base, wherein the support plate includes an opening, and wherein the support plate is configured to be moved in relation to the base to allow a wheelchair to be selectively secured to and removed from the support plate;
an intermediate plate between the base and the support plate, wherein the intermediate plate includes a second channel, and wherein the keyed shaft extends through the second channel;
an upper gear on the intermediate plate, and operatively coupled to the keyed shaft;
a drive gear operatively coupled to the upper gear; and
a drive shaft extending through the opening of the support plate, wherein the drive shaft is coupled to the drive gear,
wherein the support plate is moveable between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

17. The vehicle of claim 16, wherein the support plate is configured to linearly move and rotate in relation to the base.

18. The vehicle of claim 16, wherein the platform system further comprises:
one or more couplers configured to secure the wheelchair on the support plate;
one or more actuators configured to automatically move the support plate in relation to the base;
a lock configured to secure the support plate in a fixed position in relation to the base; and
a backing panel upwardly extending from the support plate, wherein the backing panel comprises a headrest and a seatbelt.

19. The vehicle of claim 16, wherein the platform system further comprises:
a second ball bearing on the support plate, wherein the drive shaft is coupled to the second ball bearing; and
a third ball bearing coupled to the upper gear.

20. A method for a platform system for use within an internal cabin of a vehicle, the method comprising:
providing a base having a first channel;
providing a lower gear on a geared tracked retained within the first channel;
providing a first ball bearing coupling a keyed shaft to the lower gear;
providing a support plate moveably coupled to the base, wherein the support plate includes an opening, and wherein the support plate is configured to be moved in relation to the base to allow a wheelchair to be selectively secured to and removed from the support plate;
providing an intermediate plate between the base and the support plate, wherein the intermediate plate includes a second channel, and wherein the keyed shaft extends through the second channel;

providing an upper gear on the intermediate plate, and operatively coupled to the keyed shaft;

providing a drive gear operatively coupled to the upper gear; and a drive shaft extending through the opening of the support plate, wherein the drive shaft is coupled to the drive gear, the method further comprising:

moving the support plate in relation to the base to allow the wheelchair to be selectively secured to and removed from the support plate, wherein said moving comprises moving the support plate between a first position in which the support plate is configured to support the wheelchair in a forward-facing position within the internal cabin, and a second position in which at least a portion of the support plate is moved into an aisle of the internal cabin to allow the wheelchair to be moved onto and off the support plate.

21. The method of claim 20, wherein said moving comprises linearly moving and rotating the support plate in relation to the base.

\* \* \* \* \*